Patented Nov. 13, 1945

2,389,078

UNITED STATES PATENT OFFICE 2,389,078

LINOLEUM COMPOSITION

Paul O. Powers, Manheim Township, Lancaster County, Pa., assignor to Armstrong Cork Company, Lancaster, Pa., a corporation of Pennsylvania No Drawing. Application August 20, 1942, Serial No. 455,437

12 Claims. (Cl. 260—19)

This is a continuation-in-part of my copending application Serial No. 409,653, filed September 5, 1941.

This invention or discovery relates to linoleum compositions, and more particularly, to linoleum cements; and it comprises a linoleum composition which includes a condensation product of an aldehyde and a dihydroxy benzophenone or a condensation product of an aldehyde and a di (hydroxyaryl) methane which compound may be generically represented by the structural formula:

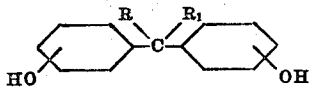

in which R and R' may be the same or different substituents selected from the group consisting of hydrogen, halogen, alkyl, or together they may represent a cyclic aliphatic hydrocarbon radical; all as more fully hereinafter set forth and as claimed.

The cements used in making linoleum usually contain as a characteristic ingredient a substance known as "linoxyn"; a product of the oxidation of drying oils. In linoleum manufacture, "linoxyn" is generally made by oxidizing linseed oil, by exposure to the air. In oxidizing linseed oil by air blowing, the oil is thickened or bodied.

There are various well-known ways of making linoleum cement. In the so-called scrim or shed oil process the requisite oxidation and thickening of the oil is brought about by allowing the oil to slowly drip over muslin sheets hung in festoons in sheds for bringing it into contact with atmospheric oxygen. In the so-called Walton process the oil is heated with driers, and air is blown through. In both processes, a semi-solid, plastic mass results which includes substantial portions of oxidized, but uncoagulated, oil and linoxyn. Linoleum cements usually comprise this partially processed drying oil and a resin such as rosin, ester gum, kauri gum, and the like. Ordinarily linoleum cements comprise 65% to 85% partially processed drying oil and 15% to 35% resin. The drying oil generally employed is linseed oil but other oils such as soya bean oil and the like may be used. The product known to the art as linoleum is prepared by admixing these linoleum cements, comprising processed oil and resin, with a suitable filler such as cork, wood flour and the like and applying the same to a burlap foundation. A similar product, known as "Linoflor," is made by applying such composition to a saturated felt foundation. It is essential, that the final products contain a completely oxidized or coagulated oil or linoleum cement. It is, therefore, necessary that the product undergo a further process of polymerization and possibly some oxidation, depending upon the type of cement used, to render it sufficiently hard to be commercially serviceable. This further process is necessarily carried out after the product of the mixing operation has been consolidated. This process is usually referred to as seasoning, stoving, curing or maturing, and is hereinafter referred to as maturing. The maturing stage is usually carried out in a warm stove and is expensive, as it takes a considerable time, several weeks or so, to mature the linoleum sufficiently for commercial usage.

Various ingredients have been added to linoleum compositions for the purpose of shortening the time required for maturing the linoleum mix. Among the materials which have been tried have been certain condensation products of formaldehyde with certain phenols and cresols. However, these products heretofore used as hardening diluents in linoleum compositions possess one or more of the decided disadvantages of being highly volatile and, therefore, their presence in the stoves and in the mix is a definite health hazard; of being substantially nonreactive and having no appreciable effect on the maturing time when used in relatively small quantities and having only a slight effect when used in relatively large proportions such as 20% or more of the cement; and, of showing no appreciable effect upon the maturing of the mix at the temperatures at which linoleum is matured, that is, temperatures of about 160° F. to about 200° F.

I have found that dihydroxy benzophenone and certain other phenols which may be generically termed di (hydroxaryl) methanes may be condensed with various aldehydes or aldehyde yielding compounds, and the reactive condensation products formed are insoluble in raw drying oil but are soluble in oxidized drying oil and may be successfully incorporated into a linoleum cement to greatly accelerate the maturing of the linoleum mix. These phenolic resins are not volatile at the temperatures employed in maturing the mix and, therefore, there is no possibility of dangerous fumes and gases emitting from the stoves. Further, these accelerators, even when used in relatively small amounts, greatly accelerate the maturing of the linoleum mix at the temperatures commonly used in the stoving operation, that is, they reduce the maturing time required to obtain the necessary hardness.

The phenols, other than benzophenone, suitable for the preparation of these resinous accelerators for use in linoleum compositions are herein designated by the generic expression "di (hydroxyaryl) methanes" and may be generically represented by the following structural formula:

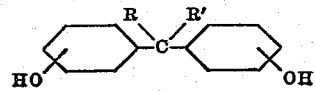

in which R and R' may be the same or different substituents selected from the group consisting of hydrogen, halogen, alkyl, or together they may represent a cyclic aliphatic hydrocarbon radical hereinafter designated as an "alicyclyl" radical. The hydrogen atoms in the nuclei may be substituted by halogen, alkyl, aryl, aralkyl, or hydroxyl groups. The nuclei should be so substituted, however, that at least two reactive positions remain open in each nucleus. Such reactive positions are generally ortho or para with respect to the hydroxyl groups in the nuclei. These benzophenones and di (hydroxyaryl) methanes having at least two reactive positions available in the nuclei which nuclei are linked through an aliphatic or substituted aliphatic radical exhibit the unique properties which render them suitable for the preparation of the resinous accelerators of this invention. These di (hydroxyaryl) methanes are also known as "bis-arylol methanes." These benzophenones and di (hydroxyaryl) methanes are known as "bis-phenols." These compounds may be further defined as the reaction product of a carbonyl compound, which may be represented by the following generic formula:

in which R may be a substituent selected from the group consisting or hydrogen and alkyl and R' may be a substituent selected from the group consisting of alkyl, aryl, and aralkyl, with a phenol having at least three reactive positions available in each nucleus. Examples of such bis-phenols are the following:

Beta,beta-bis(4-hydroxy-phenyl)-propane
Bis-(4-hydroxy-phenyl)-methane
4,4'-dihydroxy-benzophenone
Beta,beta-(2,4'-dihydroxy-diphenyl)-propane
Beta,beta-bis(2-hydroxy-phenyl)-propane
Bis-(2-hydroxy-phenyl)-methane
Bis-(4-hydroxy-2 methyl-phenyl)-methane
Beta,beta-bis-(4-hydroxy-2 methyl-phenyl)-butane
Beta,beta-bis-(2,4' dihydroxy-phenyl)-pentane To produce the phenolic resins which are added to linoleum compositions within the scope of my invention, any of the di (hydroxyaryl) methanes or any mixture of them may be reacted with an aldehyde, such as formaldehyde, paraformaldehyde, acetaldehyde, benzaldehyde, furfural, or aldehyde yielding compositions such as hexamethylenetetramine, aldehyde ammonia, and the like, or mixtures of these compositions. The terms "aldehyde" and "formaldehyde" as used in this specification and the appended claims are meant to include both the aldehyde and any compositions which yield the aldehyde at the reaction conditions employed during the condensation.

As the benzophenones and di (hydroxyaryl) methanes used to produce my phenolic resins have at least two reactive positions available in each of the linked nuclei, or a total of four reactive positions in each molecule, relatively large amounts of aldehyde may be used. At least three and preferably about 4 mols of aldehyde are reacted with one mol of phenol at a temperature not over 100° C. to produce a soft, reactive resin. When such a reactive resin is added to the cement in the linoleum composition and the composition is then matured, the reactive resin condenses with itself and possibly reacts with the linoleum cement at the low maturing temperatures to greatly shorten the maturing time.

In practicing my invention, a small amount of these phenolic condensation products may be added to the linoleum compositions known in the art. The compositions thus prepared may then be applied to any suitable backing material and processed and matured in any manner now commonly used or known to the art. Linoleum mixes containing the accelerators of my invention are matured at a greater saving of time than are the compositions heretofore known.

Although the compositions of my invention are by no means limited to the proportion of accelerator added, it is advantageous that the accelerator be present in relatively small amounts. I have found it particularly advantageous to employ the reactive phenol-aldehyde condensation products in amounts equal to about 1% to about 10% of the weight of the linoleum cement. Should less than 1% of the accelerator be employed in the cement, no substantial acceleration of maturing is obtained. The use of more than 10% of condensation product is somewhat disadvantageous in that, with more than 10% of the condensation product present, there is a tendency for the cement to harden too rapidly resulting in a final product which may be too hard and brittle to be satisfactorily used as a floor covering. For instance, upon the addition of 5% of my accelerator to a linoleum composition requiring from 21 to 24 days for maturing, the maturing time was reduced, to about 11½ days. the effect of the accelerator is partially dependent on the percentage of accelerator used and the constituents of the mix.

The addition of accelerator to the linoleum composition may take place at any time during the consolidation of the linoleum mix, provided, of course, that said addition is made prior to the maturing step. Particularly advantageous results are obtained, however, when the accelerator is added to the linoleum cement prior to the consolidation of the cement and fillers. When such procedure is followed, the accelerator is more readily dispersed throughout the linoleum cement and therefore is more effective in reducing the maturing time of the linoleum mix.

The following examples, in which all proportions given are by weight, illustrate various specific embodiments of my invention. These examples are given merely by way of illustration and not by limitation.

*Example 1*

A mixture of 300 parts of formalin (40% by weight formaldehyde), 230 parts of beta,beta-bis (4-hydroxy-phenyl)-propane and 6½ parts of sodium hydroxide was heated for three hours at a temperature of 75° C. The condensed resin was separated from the water after acidifying at room temperature. The product thus formed was added to about 1,600 parts of linoleum cement made by combining 75% partially processed linseed oil and 25% rosin in an internal mixer and agitated until homogeneous.

*Example 2*

A mixture of 244 parts of 4,4'-dihydroxy-benzophenone and 300 parts of formalin (40% by weight formaldehyde) and 10 parts of sodium hydroxide were heated for five hours at a temperature of about 90° C. The batch was then cooled to room temperature, acidified and the water was removed. The condensation product was added to about 2,000 parts of linoleum cement made by combining 65% partially processed soya bean oil and 35% ester gum. The mixture was milled on differential rolls until homogeneous.

*Example 3*

A mixture of 202 parts of bis-(4-hydroxyphenyl)-methane and 270 parts of formalin (40% by weight formaldehyde) and 7 parts of sodium hydroxide was heated for three hours at a temperature of 75° C. The mixture was then cooled and acidified at room temperature. The water present in the batch was then removed. The reaction product thus formed was added to about 1,800 parts of linoleum cement made by combining 85% partially processed linseed oil and 15% rosin, and the resulting mixture was milled on differential rolls until homogeneous.

In all of the foregoing examples, a relatively large amount of aldehyde is used and reacts with the benzophenones or di (hydroxyaryl) methane at the usual maturing temperatures. During the maturing of the linoleum composition, there is apparently considerable condensation of the resin with itself and possibly a reaction of the resin with the linoleum cement. All of these resins are further characterized by being soluble in oxidized drying oil but insoluble in raw drying oil.

It should be understood that any aldehyde or aldehyde yielding material which is capable of reacting with the substituted phenols disclosed may be employed in the preparation of the phenol aldehyde condensation products. Likewise, other substituted phenols falling within the generic classification set out earlier in the specification may be substituted for the particular phenols specifically disclosed in the examples without departing from the scope of the invention. Also, the reactive condensation products may be added to advantage to any linoleum composition known to the art.

The use of the compositions of the invention greatly reduces the time necessary to completely mature the linoleum mix and thereby results in valuable saving in time and materials in the linoleum making process.

These linoleum compositions yield final products which are characterized by excellent wear resistance, flexibility, and resiliency. They may be utilized as coverings for floors, walls, desk tops and the like.

While the invention has been disclosed in terms of specific examples employing certain materials in definitely stated proportions, the description is intended to be merely illustrative. It is obvious that various modifications may be made without departing from the spirit of the invention and it is to be understood that the invention is limited only by the appended claims.

I claim:

1. A linoleum composition which includes a linoleum cement containing an oxidized siccative oil and resin and about 1% to about 10% of a maturing accelerator for said cement, said accelerator comprising a reactive condensation product of an aldehyde and a compound selected from the group consisting of dihydroxy benzophenone and di (hydroxyaryl) methane, said condensation product being characterized by insolubility in raw drying oil and solubility in oxidized drying oil.

2. A linoleum composition which includes a linoleum cement containing an oxidized siccative oil and resin and about 1% to about 10% of a maturing accelerator for said cement, said accelerator comprising a reactive condensation product of about 3 to about 4 mols of an aldehyde and about 1 mol of a di (hydroxyaryl) methane.

3. A linoleum composition in accordance with claim 2 in which the aldehyde is formaldehyde.

4. A linoleum composition which includes a linoleum cement containing an oxidized siccative oil and resin and about 1% to about 10% of a maturing accelerator for said cement, said accelerator comprising a reactive condensation product of about 4 mols of formaldehyde and 1 mol of a di (hydroxyaryl) methane.

5. A linoleum composition which includes a linoleum cement containing an oxidized siccative oil and resin and about 1% to about 10% of a maturing accelerator for said cement, said accelerator comprising a reactive condensation product of about 3 to about 4 mols of an aldehyde and 1 mol of 4,4'-dihydroxy-benzophenone.

6. A linoleum composition which includes a linoleum cement containing an oxidized siccative oil and resin and about 1% to about 10% of a maturing accelerator for said cement, said accelerator comprising a reactive condensation product of about 3 to about 4 mols of an aldehyde and 1 mol of beta, beta-bis (4-hydroxy-phenyl)-propane.

7. A linoleum composition which includes a linoleum cement containing an oxidized siccative oil and resin and about 1% to about 10% of a maturing accelerator for said cement, said accelerator comprising a reactive condensation product of about 3 to about 4 mols of an aldehyde and 1 mol of bis (4-hydroxy-phenyl)-methane.

8. A linoleum composition which includes a linoleum cement containing an oxidized siccative oil and resin and about 1% to about 10% of a maturing accelerator for said cement, said accelerator comprising a reactive condensation product of about 3 to about 4 mols of formaldehyde and 1 mol of bis (4-hydroxy-phenyl)-methane.

9. A linoleum composition which includes a linoleum cement containing an oxidized siccative oil and a resin and about 1% to about 10% of a maturing accelerator for said cement, said accelerator comprising a reactive condensation product of about 3 to about 4 mols of formaldehyde and 1 mol of 4,4'-dihydroxy-benzophenone.

10. A linoleum composition which includes a linoleum cement containing an oxidized siccative oil and resin and about 1% to about 10% of a maturing accelerator for said cement, said accelerator comprising a reactive condensation product of about 3 to about 4 mols of formaldehyde and 1 mol of beta, beta-bis (4-hydroxy-phenyl)-propane.

11. A linoleum composition which includes a linoleum cement containing an oxidized siccative oil and resin and about 1% to about 10% of a maturing accelerator for said cement, said accelerator comprising a reactive condensation product of about 3 to about 4 mols of an aldehyde and 1 mol of a compound selected from the group consisting of dihydroxy benzophenone and di (hydroxyaryl) methane.

12. A linoleum composition in accordance with claim 1 in which the oxidized siccative oil is oxidized linseed oil, in which the resin is rosin, and in which the reactive condensation product is formed by reaction of about 4 mols of formaldehyde with 1 mol of bis (4-hydroxy-phenyl)-methane.

PAUL O. POWERS.